United States Patent [19]

Lem

[11] Patent Number: 5,641,056

[45] Date of Patent: Jun. 24, 1997

[54] CONVEYOR SYSTEM

[75] Inventor: Hans J. Lem, Franklin Lakes, N.J.

[73] Assignee: Quantum Conveyor Systems, Inc., Northvale, N.J.

[21] Appl. No.: 450,006

[22] Filed: May 25, 1995

[51] Int. Cl.$^6$ ........................................... B65G 15/44
[52] U.S. Cl. ............................................. 198/699.1
[58] Field of Search .................... 198/688.1, 690.2, 198/698, 699, 699.1, 835, 841

[56] References Cited

U.S. PATENT DOCUMENTS

| 868,154 | 10/1907 | Bates et al. |  |
|---|---|---|---|
| 1,422,398 | 7/1922 | Wentz. |  |
| 1,833,874 | 11/1931 | Griffith et al. |  |
| 2,461,150 | 2/1949 | Flynn et al. |  |
| 2,556,920 | 6/1951 | Hills | 198/699.1 X |
| 2,732,867 | 1/1956 | May et al. |  |
| 3,253,692 | 5/1966 | Ota | 198/835 X |
| 3,603,450 | 9/1971 | Chamberlain et al. | 198/699.1 |
| 3,853,016 | 12/1974 | Lane, III et al. |  |
| 3,937,338 | 2/1976 | Cox | 198/835 X |
| 4,225,034 | 9/1980 | Sarovich. |  |
| 5,415,273 | 5/1995 | Peterson | 198/835 X |

FOREIGN PATENT DOCUMENTS

| 2233832 | 2/1973 | Germany | 198/835 |
|---|---|---|---|
| 2442028 | 3/1975 | Germany | 198/835 |
| 1121197 | 10/1984 | U.S.S.R. | 198/835 |
| 415791 | 9/1934 | United Kingdom | 198/699.1 |

*Primary Examiner*—D. Glenn Dayoan
*Attorney, Agent, or Firm*—Henry D. Pahl, Jr.

[57] ABSTRACT

A conveyor system for transporting articles up a steep gradient and having a continuous belt having article engaging lugs projecting from only the outer belt face. Conventional flat idler rollers are employed for turning the direction of the belt between the transport path and a return flight. A conventional flat drive roller is provided in the return flight between the first and second idler rollers with first and second segmented idler rollers directing the belt under tension in a wrap around the drive roller which engages only the back face of the belt with the lugs passing between segments of the segmented idler rollers.

2 Claims, 4 Drawing Sheets

5,641,056

CONVEYOR SYSTEM

BACKGROUND OF THE INVENTION

The present invention relates to a conveyor system and more particularly to such a conveyor system which will transport articles up a steep gradient, i.e. a gradient which is steep enough that surface friction may be inadequate to cause the article to advance with a conventional flat conveyor belt.

While myriad belt conveyor systems had been proposed in the prior art, there is an unmet need for a simple and reliable system for transporting articles up a steep gradient, i.e., a gradient so steep that surface friction is typically inadequate to insure that an article does not slide on a conveyor belt. While it has previously been proposed to employ conveyor belts which incorporate lugs or slats for engaging the trailing edge of an article being conveyed, such prior art systems have not been easily and inexpensively constructed since they typically require that the belt be driven at one end or the other, which is often inconvenient or inappropriate, or have required a complicated cogged driving system.

Among the several objects of the present invention may be noted the provision of a conveyor system which will transport articles up a steep incline; the provision of such a conveyor system which utilizes relatively simple driving means; the provision of such a conveyor system which employs a continuous belt having article engaging lugs projecting from only the outer belt face; the provision of such a conveyor system which is highly reliable and which is of relatively simple and inexpensive construction. Other objects and features will be in part apparent and in part pointed out hereinafter.

SUMMARY OF THE INVENTION

The conveyor system of the present invention is particularly adapted for transporting articles up a steep gradient. The conveyor system employs an elongate, flat, continuous belt having outer and back faces and having article engaging lugs projecting from only the outer belt face in parallel columns along the length of the belt. First and second idler rolls are provided for turning the direction of the belt between the transport path and a return flight, at least a portion of the transport path being inclined up a steep gradient. A drive roller is located along the return flight between the first and second idler rollers and first and second segmented idler rollers are provided for directing the belt under tension in a wrap around the drive roller which engages the back face of the belt. The lugs pass between segments of the segmented idler rollers.

BRIEF DESCRIPTION OF THE DRAWINGS

The FIG. 1 is a overall view, in perspective, of a conveyor system constructed in accordance with the present invention.

Corresponding reference characters indicate corresponding parts throughout the several views of the drawings.

DESCRIPTION OF THE PREFERRED EMBODIMENTS

Figure 1:
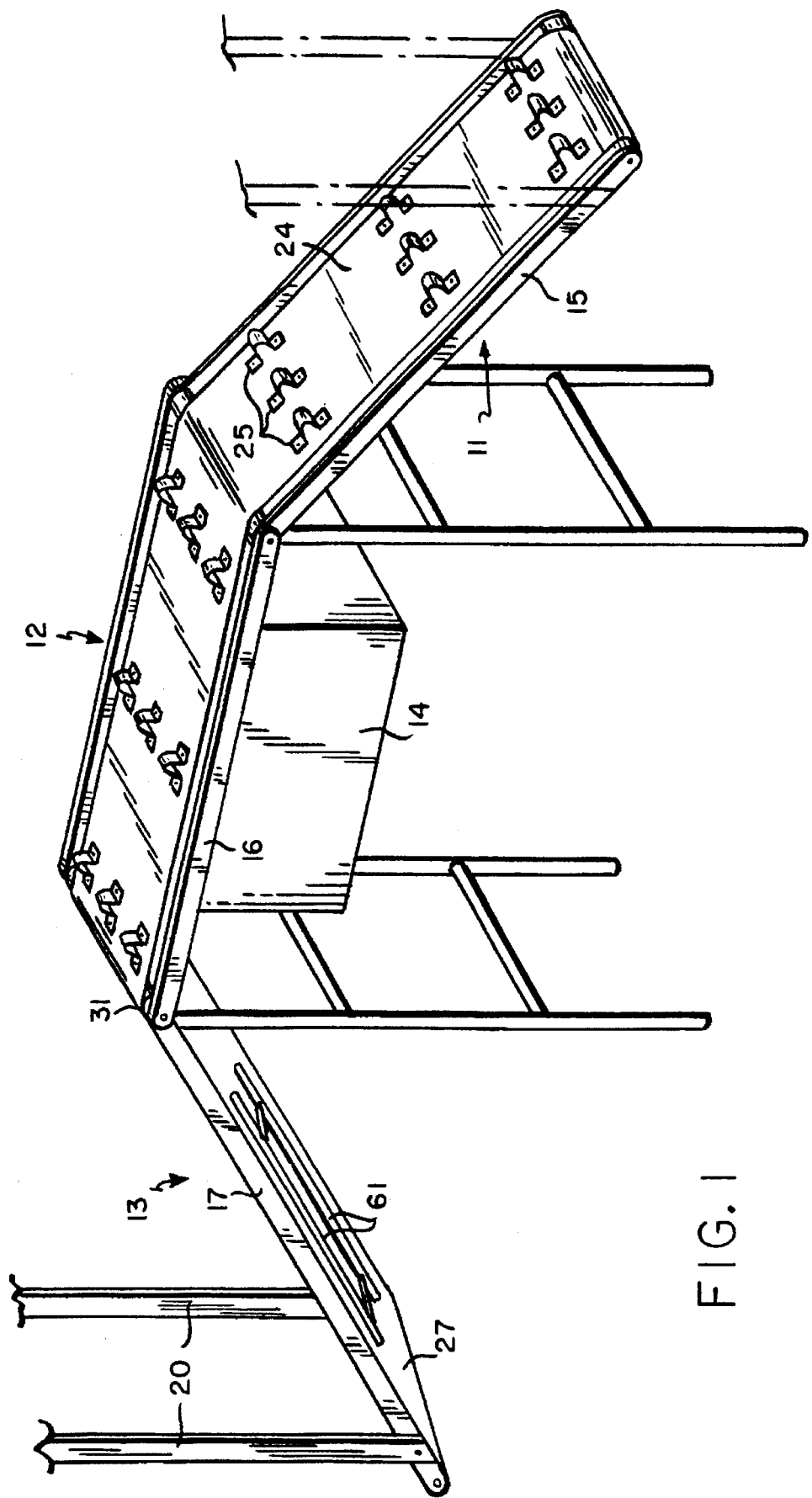

Referring now to FIG. 1, the particular embodiment illustrated there provides a lifting section 11, a horizontal transport section 12, and a lowering section 13. The components constituting each of the sections are mounted on a respective steel ladder-like frame, designated by reference characters 15–17. The inner ends of the lifting and lowering sections 11 and 13 are pivotally attached to the ends of the horizontal section 12, while the outer ends of the lifting and lowering sections are supported from ceiling hangers, 20 and 21 respectively.

A continuous flat conveyor belt 24 passes over all three sections 11–13. To enable the conveyor belt 24 to transport articles up a steep gradient, the outer face of the belt carries a multiplicity of article engaging lugs 25. The lugs 25 are arranged in three or more parallel columns extending along the length of the belt and in three or more abreast rows transversely of the belt, with the rows being separated along the length of the belt by a distance appropriate for separating individual articles being transported.

The belt 24 is driven from a central drive mechanism, designated generally by reference character 14, which is located beneath the horizontal section 13.

Conventional, flat end pulleys 27 and 29 are provided at the outer ends of the lifting and lowering sections for turning the direction of the belt between a transport path, i.e. along the tops of the sections 11–13, and a return flight underneath those sections. In the particular embodiment illustrated, flat pulleys 31 and 33 are also provided for turning the belt along the transport path at the juncture between each of the inclined sections 11 and 13 and the horizontal section 12.

Figure 2:
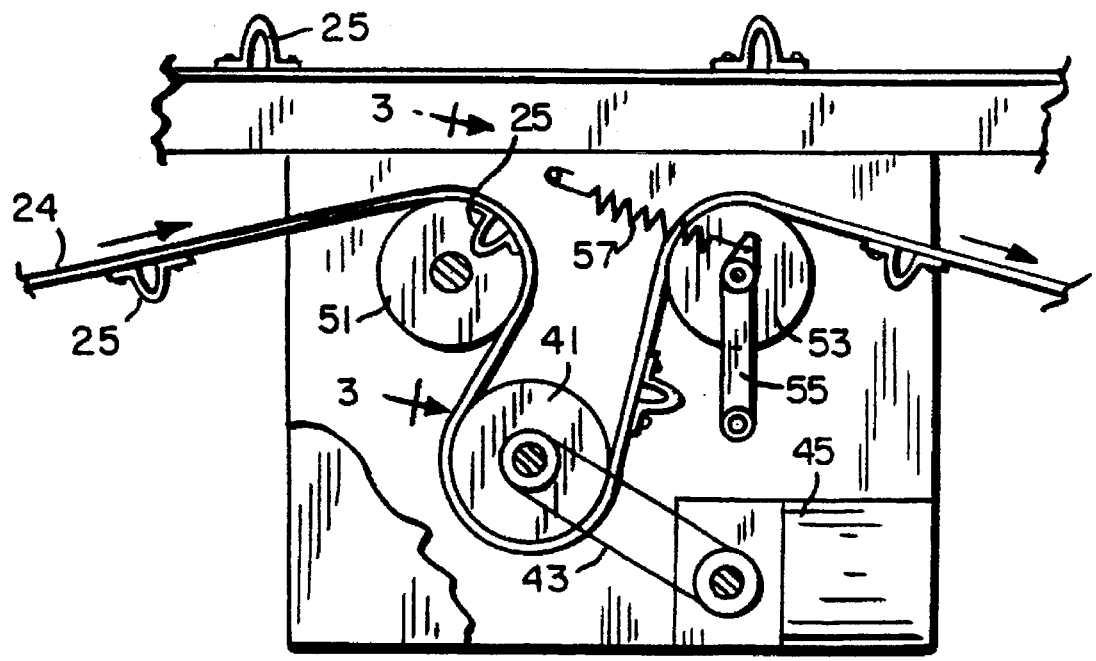
FIG. 2 is a side-view, with parts broken away, of a central drive mechanism employed in the conveyor system of FIG. 1.

Referring now to FIG. 2, the central drive system 14 provides a flat-faced drive pulley 41 which is driven, through a belt 43, from a gearmotor 45. The belt 24 is directed around the drive pulley by first and second segmented idler rollers designated by reference characters 51 and 53. The first roller 51 is journaled on a fixed axle while the axle of the second roller 53 is mounted on a linkage 55 which is biased by a spring 57 so as to maintain the belt 24 under tension.

Figure 3:
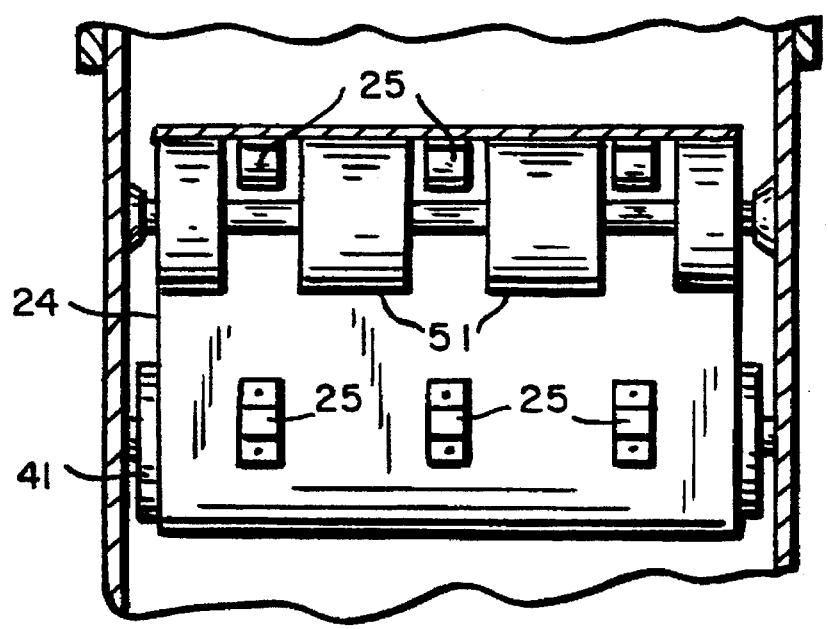
FIG. 3 is a sectioned view, taken substantially on the line 3—3 of FIG. 2, illustrating the construction of a segmented pulley employed in the drive mechanism.
Figure 4:
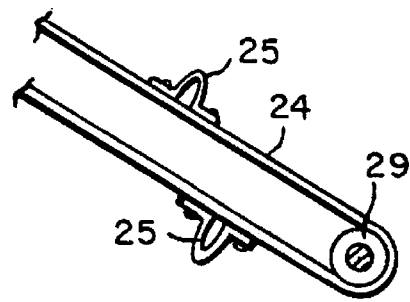
FIG. 4 is a sectional view illustrating an end pulley of the conveyor system of FIG. 1.

As may be seen, it is the back, non-lugged side of the belt 24 which contacts the drive pulley 41 so that the drive pulley can be of simple flat faced construction. As will be understood, the driving force which can be applied to the belt 24 is, to a substantial extent, a function of the length of the wrap of the belt 24 around the drive pulley 41 and, preferably, the segmented idler rollers 51 and 53 are positioned so that a substantial wrap, in the order of 180 degrees around the drive pulley 41, is provided. As may be seen from FIG. 3, the spacing of the segments of each of the idler rollers 51 and 53, is such that the lugs 25 can pass freely between the segments. However, since these rollers do not provide any driving force, they do not need to have any circumferential notches or other complicated construction as would be necessary for applying driving force to the lugged face of the belt 24.

Figure 5:
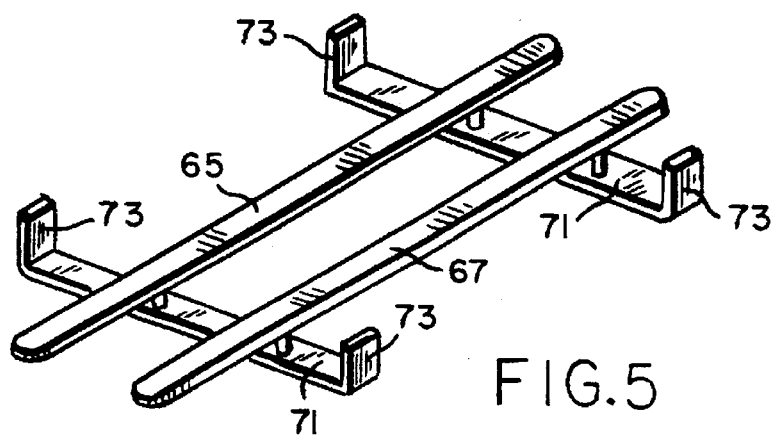
FIG. 5 illustrates guides employed with the return flight of the belt employed in the conveyor system of FIG. 1.

To prevent excessive droop of the return flight underneath the lifting and lowering sections, guide structures, designated generally by reference characters 61 and 63, are preferably provided under each of those sections. Referring now to FIG. 5, each of the guide structures comprises a pair of slide strips 65 and 67 which are mounted on a frame 71, hung under the respective conveyor section by means of brackets 73. The slide strips 65 and 67 engage the outer surface of the belt 24 between the columns of lugs 25 and support the belt so that it does not hang down substantially below the respective inclined conveyor section.

Figure 6:
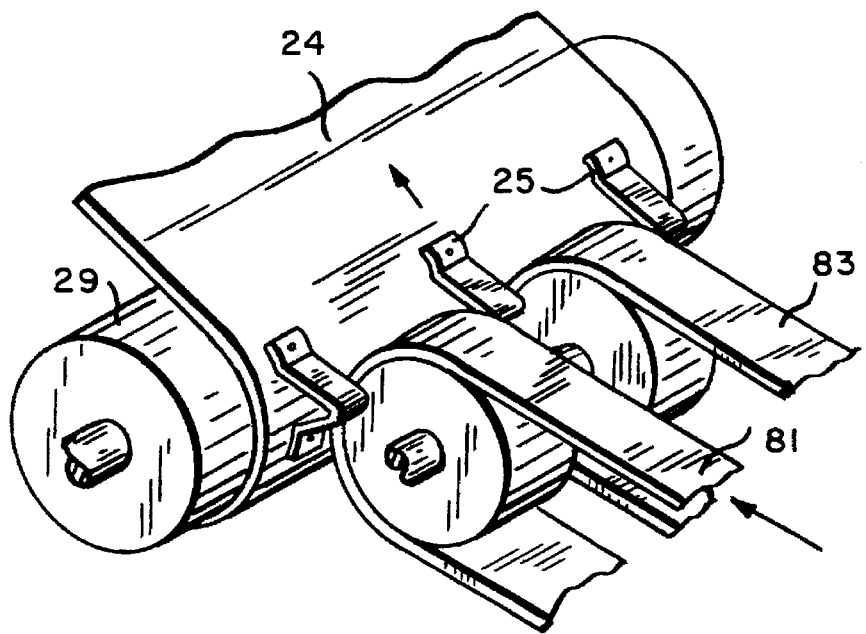
FIG. 6 illustrates the matter in which the conveyor system of FIG. 1 interfaces with a known type of horizontal conveyor/accumulator system.
Figure 7:
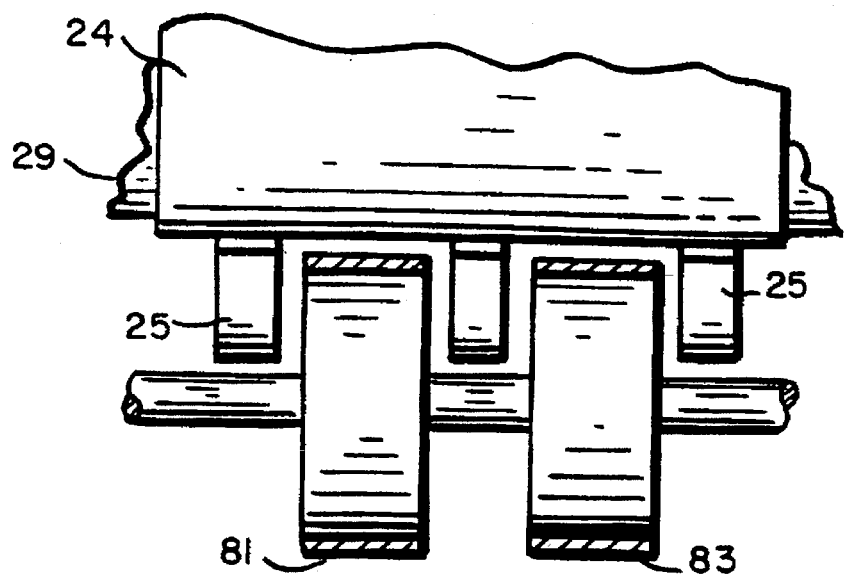
FIG. 7 is a sectional view taken substantially on the line 6—6 of FIG. 6.

Referring now to FIG. 6, there is illustrated an arrangement for interfacing the lifting section 11 to a known type of horizontal conveyor/accumulator, designated generally by reference character 80. This horizontal conveyor system may for example be that disclosed in U.S. Pat. No. 4,511,030, issued Apr. 16, 1985 to Hans J. Lem. As described in said patent, the conveyor system disclosed therein involves a pair of belts 81 and 83 which are interleaved between guides, not shown in FIG. 6. As is also disclosed, the guides are selectively liftable by means of pneumatic bladders, so as to lift articles being transported off of the belts 81–83 so that they may be stopped and/or accumulated within the horizontal run. However, by lowering the guides, an article or a package being conveyed can selectively be fed onto the lugged belt 24 at the lower end of the lifting section 11. Preferably, the spacing of the belts 81 and 83 is, as illustrated such that the belts fit between the column spacing of the lugs 25 so that the lugs can pass between the end rollers over which the belts 81 and 83 pass and can pick up an article being fed off the horizontal section 80.

Figure 8:
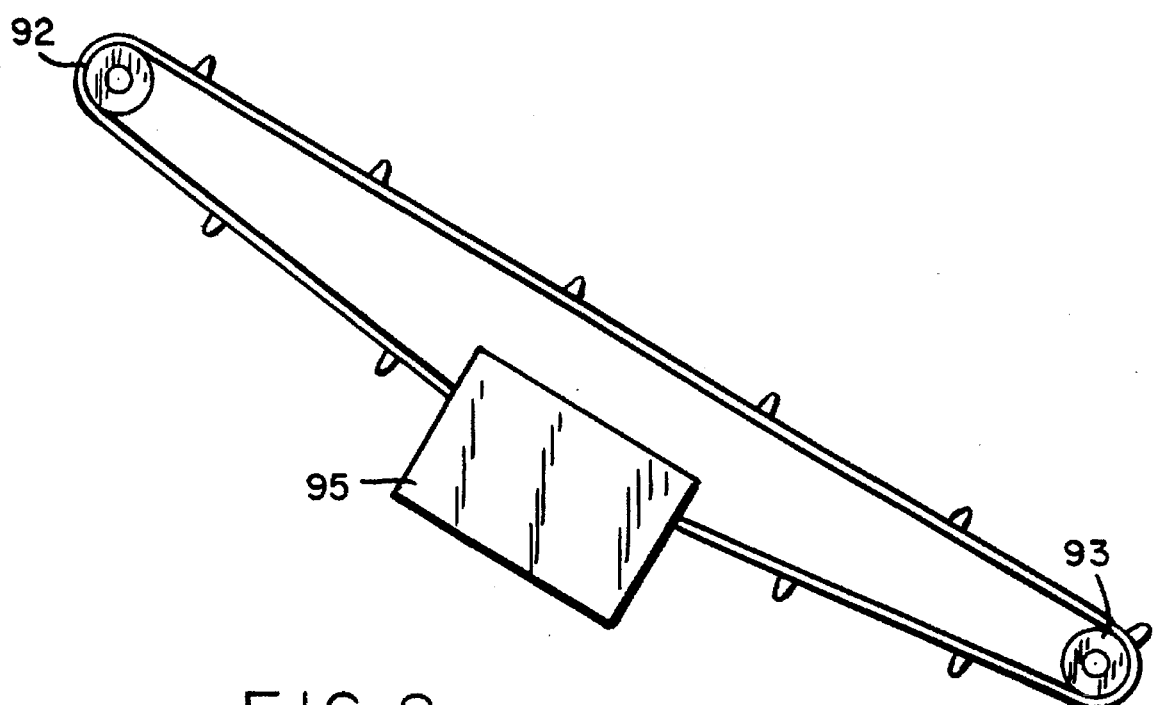
FIG. 8 is a side view of an alternate construction.

While the embodiment illustrated in FIG. 1 comprises three sections, 11–13 respectively, it should be understood that the advantages of the present invention can be incorporated in a single lifting or lowering section. Such a lifting section is illustrated in FIG. 8. In this embodiment, a lugged belt 91 passes over flat idler rollers 92 and 93 at each end of an inclined transport section and a central drive mechanism 95 is located in the return flight, essentially in the same manner as the embodiment illustrated previously.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A conveyor system for transporting articles up a gradient, said conveyor system comprising:

an elongate, flat, continuous belt having outer and back faces and having article engaging lugs projecting only from said outer belt face in parallel columns along the length of the belt;

at least first and second idler rollers at the ends of a transport path, said transport path including a lifting section, a horizontal run section, and a lowering section, said roller being operative for turning the direction of said belt between said transport path and a return flight, at least a portion of said transport path being inclined;

along said return flight between said first and second idler rollers and beneath said horizontal section, a drive roller; and first and second segmented idler rollers directing said belt under tension in a wrap around said drive roller which engages the back face of said belt, said lugs passing between segments of said segmented idler rollers.

2. A conveyor system for transporting articles up a gradient, said conveyor system comprising:

an elongate, flat, continuous belt having outer and back faces and having article engaging lugs projecting only from said outer belt face arranged in parallel columns along the length of the belt and parallel rows extending transversely to the length of the belt;

at least first and second flat-faced idler rollers at the ends of a transport path for turning the direction of said belt between said transport path and a return flight, at least a portion of said transport path being inclined up a gradient;

underneath the inclined portion of said transport path, guide means including a pair of elongate slides engaging the outer face of said belt between rows of lugs for supporting said belt along the corresponding portion of said return flight;

along said return flight between said first and second idler rollers, a flat-faced drive roller;

motor means for rotating said drive roller;

first and second segmented idler rollers directing said belt under tension in a wrap of in the order of 180° around said drive roller which engages the back face of said belt, said lugs passing between segments of said segmented idler rollers.

* * * * *